(12) United States Patent
Shetty et al.

(10) Patent No.: US 10,961,834 B2
(45) Date of Patent: Mar. 30, 2021

(54) FRACTURE NETWORK FLUID FLOW SIMULATION WITH JUNCTION AREA MODELING

(71) Applicant: Halliburton Energy Services, Inc., Houston, TX (US)

(72) Inventors: Dinesh Ananda Shetty, Sugarland, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 359 days.

(21) Appl. No.: 15/763,158

(22) PCT Filed: Nov. 9, 2015

(86) PCT No.: PCT/US2015/059756
§ 371 (c)(1),
(2) Date: Mar. 26, 2018

(87) PCT Pub. No.: WO2017/082862
PCT Pub. Date: May 18, 2017

(65) Prior Publication Data
US 2018/0306015 A1    Oct. 25, 2018

(51) Int. Cl.
*E21B 43/26* (2006.01)
*G06F 111/10* (2020.01)
*G01V 99/00* (2009.01)

(52) U.S. Cl.
CPC ............ *E21B 43/26* (2013.01); *G01V 99/005* (2013.01); *E21B 2200/20* (2020.05); *G01V 2210/646* (2013.01); *G06F 2111/10* (2020.01)

(58) Field of Classification Search
CPC .............................. E21B 43/26; G01V 99/005; G01V 2210/646; G06F 2111/10
See application file for complete search history.

(56) References Cited

U.S. PATENT DOCUMENTS

| 8,731,889 B2 * | 5/2014 | Du ................. E21B 43/267 |
| | | 703/10 |
| 9,103,194 B2 | 8/2015 | Khvoenkova et al. |

(Continued)

FOREIGN PATENT DOCUMENTS

WO    2017082862 A    5/2017

OTHER PUBLICATIONS

Ben, Y., et al. "Simulating Hydraulic Fracturing with Discontinuous Deformation Analysis" American Rock Mechanics Association 12-480 (2012) (Year: 2012).*

(Continued)

*Primary Examiner* — Jay Hann
(74) *Attorney, Agent, or Firm* — John W. Wustenberg; Parker Justiss, P.C.

(57) ABSTRACT

An illustrative hydraulic fracturing flow simulation system includes: a data acquisition module collecting measurements from a subterranean formation; a processing module implementing a hydraulic fracturing simulation method; and a visualization module that displays the time-dependent spatial distribution. The simulation method includes: deriving from the measurements a network of fractures having junctions where two or more fractures intersect; ordering a set of corner points associated with each junction; calculating a junction area from each set of corner points; determining a current state that includes flow parameter values at discrete points arranged along the fractures in said network; constructing a set of linear equations for deriving a subsequent state from the current state while accounting for said junction areas; and repeatedly solving the set of linear equations to obtain a sequence of subsequent states, the sequence embodying a time-dependent spatial distribution of at least one flow parameter.

20 Claims, 3 Drawing Sheets

(56) References Cited

U.S. PATENT DOCUMENTS

| | | | |
|---|---|---|---|
| 10,352,146 B2* | 7/2019 | Shetty | E21B 43/26 |
| 10,689,960 B2* | 6/2020 | Copeland | E21B 43/26 |
| 2010/0106472 A1 | 4/2010 | Kaminsky et al. | |
| 2013/0204588 A1* | 8/2013 | Copeland | E21B 43/26 703/10 |
| 2014/0151035 A1* | 6/2014 | Cohen | E21B 43/26 166/250.15 |
| 2015/0006136 A1 | 1/2015 | Hinkley et al. | |
| 2015/0032425 A1 | 1/2015 | Kulkarni et al. | |
| 2015/0066463 A1 | 3/2015 | Shetty et al. | |
| 2016/0265331 A1* | 9/2016 | Weng | E21B 43/267 |
| 2018/0230784 A1* | 8/2018 | Rodriguez Herrera | E21B 43/267 |
| 2018/0355707 A1* | 12/2018 | Rodriguez Herrera | G01V 1/42 |
| 2019/0025460 A1* | 1/2019 | Mustapha | G01V 99/005 |

OTHER PUBLICATIONS

MFrac "Meyer Fracturing Simulators" User's Guide, ninth edition (2011) (Year: 2011).*

Weng, X., et al. "Modeling of Hydraulic Fracture Network Propagation in a Naturally Fractured Formation" Society of Petroleum Engineers, SPE 140253 (2011) (Year: 2011).*

Kamath, J., et al. "Modeling Fluid Flow in Complex Naturally Fractured Reservoirs" Society of Petroleum Engineers, SPE 39547 (1998) (Year: 1998).*

Al-Hinai, O., et al. "Modeling Fluid Flow in Complex Naturally Fractured Reservoirs" Society of Petroleum Engineers, SPE-173319-MS (Feb. 2015) (Year: 2015).*

Shetty, et al.; "A Fast Parallel Coupled Hydraulic Fracture Simulator"; SPE-171902-MS; Abu Dhabi International Petroleum Exhibition and Conference; Nov. 10-13, 2014; 14 pgs.

Bai, et al.; "Tightly Coupled Fluid-Structure Interaction Computation Algorithm for Hydraulic Fracturing Simulations"; ARMA 14-7258; 48th US Rock Mechanics/Geomechanics Symposium; Jun. 1-4, 2014; 12 pgs.

* cited by examiner

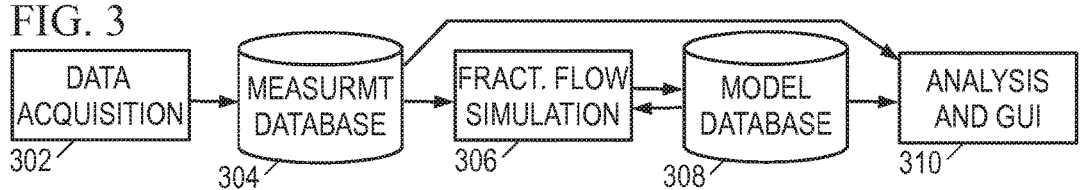
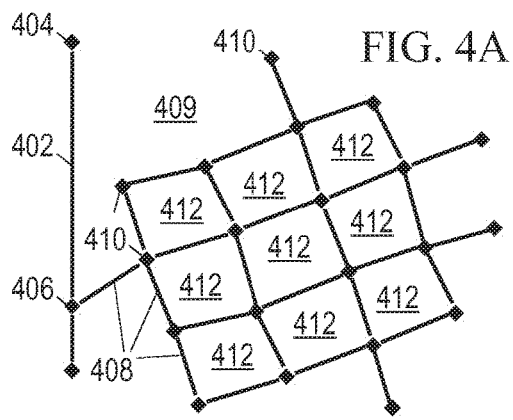
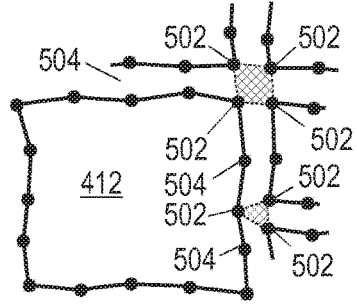
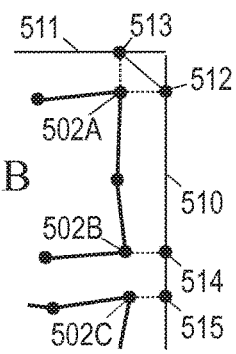
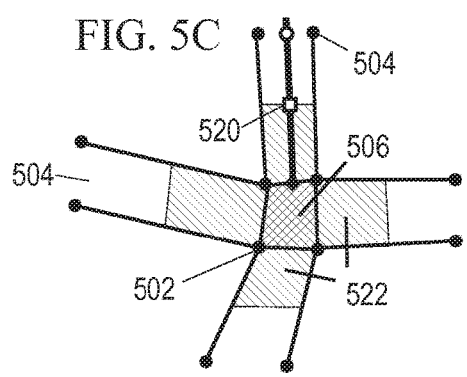

FRACTURE NETWORK FLUID FLOW SIMULATION WITH JUNCTION AREA MODELING

CROSS-REFERENCE TO RELATED APPLICATION

This application is the National Stage of, and therefore claims the benefit of, International Application No. PCT/US2015/059756 filed on Nov. 9, 2015, entitled "FRACTURE NETWORK FLUID FLOW SIMULATION WITH JUNCTION AREA MODELING," which was published in English under International Publication Number WO 2017/082862 on May 18, 2017. The above application is commonly assigned with this National Stage application and is incorporated herein by reference in its entirety.

BACKGROUND

Unconventional reservoirs often have a low-permeability rock matrix that impedes fluid flow, making it difficult to extract hydrocarbons (or other fluids of interest) at commercially-feasible rates and volumes. Fortunately, the effective permeability of the formation can be increased by hydraulic fracturing. When the rock matrix is exposed to a high-pressure high-volume flow of a relatively incompressible fluid, the low permeability causes sharp gradients in the formation's stress field, forcing integrity failures at the relatively weakest points of the rock matrix. Such failures often occur as sudden "cracking" or fracturing of the matrix that momentarily reduces the stress gradient until it can be rebuilt by the intruding fluid flow. As the high-pressure flow continues, the fractures may propagate, for example, as an intermittent series of small cracks. The injected fluid also deforms and shifts blocks of matrix material, further complicating the fracture propagation analysis. As yet another complication, small grains of sand or other proppants may be added to the flow with the goal of keeping the fractures open after the fluid pressure is removed.

Accordingly, accurate modeling of the hydraulic fracturing operation requires that fluid flow phenomena be taken into account. However, the computational resources available for modeling are typically limited and the challenge is to maximize the accuracy and efficiency of the modeling process within these constraints while ensuring that the accuracy is sufficient to guide oilfield operators. For example, inaccuracies in predicting and controlling proppant distribution may significantly impair the efficiency and rate at which fluids can be recovered from the formation.

BRIEF DESCRIPTION OF THE DRAWINGS

Accordingly, the drawings and the following description disclose simulation systems and methods that simulate proppant-carrying hydraulic flows using junction area modeling. Such modeling improves the accuracy with which proppant distributions are determined. In the drawings:

FIG. 3 is a diagram of an illustrative modeling software architecture.

FIG. 4A is a grid topology representation of an illustrative fracture network.

FIG. 4B is an illustrative one dimensional representation of a fracture.

FIGS. 5A-5C are illustrative topologies of representative junctions.

FIG. 6 is an illustrative polygon.

Figure 1:
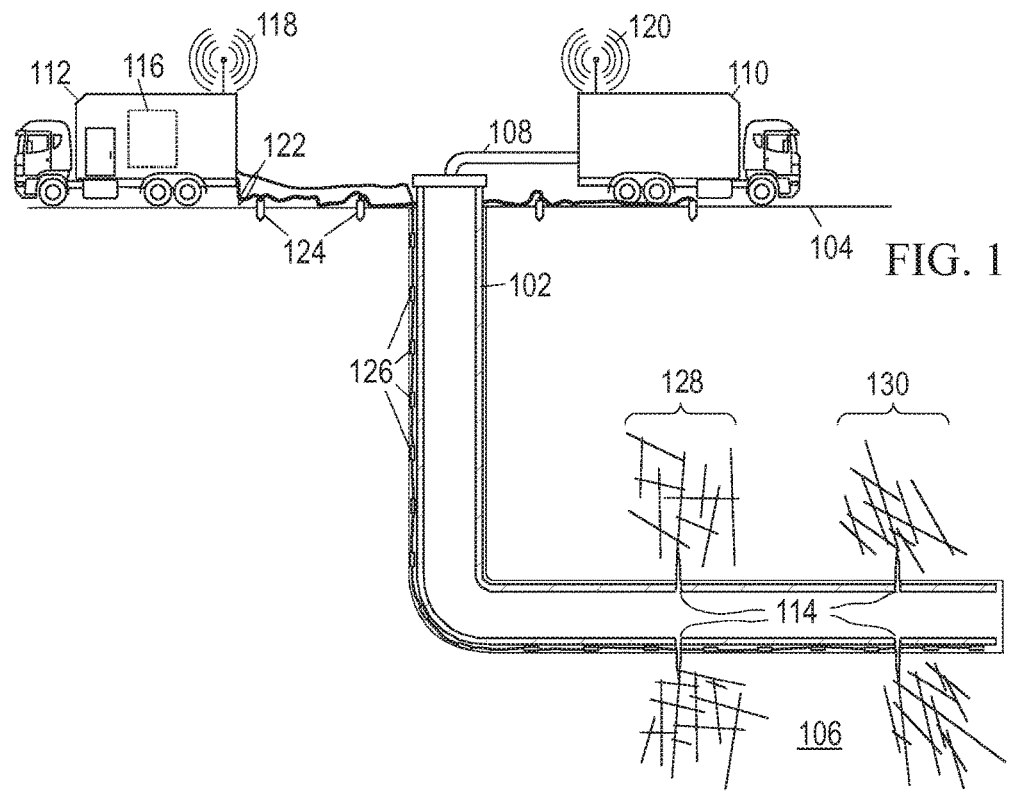
FIG. 1 is an environmental view of an illustrative hydraulic fracturing operation.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

FIG. 1 shows the environment of an illustrative hydraulic fracturing operation. A wellbore 102 extends from the surface 104 into a subterranean region 106. Typically, the subterranean region includes a reservoir that contains hydrocarbons or other resources such as, e.g., shale, coal, sandstone, granite, or other rocks with pores containing oil or natural gas. The subterranean region 106 may include naturally fractured rock or natural rock formations that are not fractured to any significant degree. When the subterranean region 106 includes tight gas formations (i.e., natural gas trapped in low permeability rock such as shale), it is typically desirable to create additional fractures in the formation to increase the formation's effective permeability.

Accordingly, FIG. 1 also shows an injection assembly coupled to supply a high-pressure, high-volume fluid flow via a conduit 108 to the wellbore 102. The injection assembly includes one or more pump trucks 110 and instrument trucks 112 that operate to inject fluid via the conduit 108 and the wellbore 102 into the subterranean region 106, thereby opening existing fractures and creating new fractures. The fluid reaches the formation via one or more fluid injection locations 114, which in many cases are perforations in the casing of wellbore 102. Such casing may be cemented to the wall of the wellbore 102, though this is not a requirement. In some implementations, all or a portion of the wellbore 102 may be left open, i.e., without casing. The conduit 108 may include an injection manifold and feed pipe, as well as piping internal to the wellbore such as a work string, coiled tubing, sectioned pipe, or other types of conduit.

The fracture treatment may employ a single injection of fluid to one or more fluid injection locations 114, or it may employ multiple such injections, optionally with different fluids. Where multiple fluid injection locations 114 are employed, they can be stimulated concurrently or in stages. Moreover, they need not be located within the same wellbore 102, but may for example be distributed across multiple wells or multiple laterals within a well. A treatment control system 116 coordinates operation of the injection assembly components (pump trucks, feed tanks, throttles, valves, flow sensors, pressure sensors, etc.) to monitor and control the fracture treatment. Though shown as being localized to a single instrument truck 112, the control system 116 may in practice take the form of multiple data acquisition and processing systems optionally distributed throughout the injection assembly and wellbore 102, as well as remotely-coupled offsite computing facilities available via communication links and networks. Though the computing system is described below as a separate entity for implementing hydraulic fracture modeling, some contemplated embodiments of the treatment control system 116 have the simulator as an integrated component.

The pump trucks 110 can include mobile vehicles, immobile installations, skids, hoses, tubes, fluid tanks, fluid reservoirs, pumps, valves, mixers, or other types of structures and equipment. They supply treatment fluid and other materials (e.g., proppants, cross linked gels, linear gels, surfactants, breakers, stop-loss materials) for the fracture treatment. The illustrated pump trucks 110 communicate treatment fluids into the wellbore 102 at or near the level of the ground surface 104. The pump trucks 110 are coupled to valves and pump controls for starting, monitoring, stopping, increasing, decreasing or otherwise controlling pumping as well as controls for selecting or otherwise controlling fluids pumped during the treatment.

The instrument trucks 112 can include mobile vehicles, immobile installations, or other suitable structures and sensors for measuring temperatures, pressures, flow rates, and other treatment and production parameters. The example instrument trucks 112 shown in FIG. 1 include an treatment control system 116 that controls or monitors the fracture treatment applied by the injection assembly. The injection assembly may inject fluid into the formation above, at, or below a fracture initiation pressure; above, at, or below a fracture closure pressure; or at another fluid pressure.

Communication links 118, 120 enable the instrument trucks 112 to communicate with the pump trucks 110 and other equipment at the ground surface 104. Additional communication links 122 enable the instrument trucks 112 to communicate with sensors or data collection apparatus in the wellbore 102, other wellbores, remote facilities, and other devices and equipment. The communication links can include wired or wireless communications assemblies, or a combination thereof. FIG. 1 shows communication links 122 for an array of surface seismic sensors 124 and an array of downhole seismic sensors 126 for detecting and locating microseismic events. Though downhole sensors 126 are shown as being positioned in the injection well, they can also or alternatively be located in one or more nearby monitoring wells. Sensors 124 and/or 126 detect seismic energy from the microseismic events that occur as fractures are formed and propagated. The received energy signals from the sensors are processed by the control system 116 to determine the microseismic event locations, times, and magnitudes. Such information is indicative of the fracture locations and dimensions, which information may be used to determine when the fracturing operations should be terminated and how to carry out subsequent operations to achieve the desired results.

The treatment control system 116 may include data processing equipment, communication equipment, and other equipment for monitoring and controlling injection treatments applied to the subterranean region 106 through the wellbore 102. The treatment control system 116 may be communicably linked to a remote computing facility that can calculate, select, or optimize treatment parameters for initiating, opening, extending, and conveying proppant into fractures. The treatment control system 116 may receive, generate or modify an fracture treatment plan (e.g., a pumping schedule) that specifies properties of an fracture treatment to be applied to the subterranean region 106. Based on such modeled behavior results, the treatment control system 116 shown in FIG. 1 controls operation of the injection assembly to optimize fluid compositions, flow rates, total flow volumes, injection pressure, and shut-in intervals.

FIG. 1 shows that an treatment has fractured the subterranean region 106, producing first and second fracture families 128, 130 from respective perforations 114. The induced fractures may extend through naturally fractured rock, regions of un-fractured rock, or both. The injected fracturing fluid can flow from the induced fractures into the natural fracture networks, into the rock matrix, or into other locations in the subterranean region 106 (e.g., faults, voids). The injected fracturing fluid can, in some instances, dilate or propagate the natural fractures or other pre-existing fractures in the rock formation. The formation and propagation of fractures produces microseismic events, which may be identified and located based on analysis of the signals from sensors 124 and 126. The progression of the fracturing operation can thus be monitored and such monitoring used to derive information useful for modeling the fracture networks that have been formed and which may be formed in future fracturing operations in the region.

In some implementations, the control system 116 collects and analyzes the signals from sensors 124, 126 to map fractures, monitor the spatial distribution of injected fluids, and to control the fluid injection parameters to optimize the modification of effective formation permeability. For example, the treatment control system 116 can modify, update, or generate a fracture treatment plan (pumping rates, pressures, volumes, fluid compositions, and timing) based on the estimated spatial distributions of various fluid components (optionally derived from tiltmeter and microseismic monitoring of the ongoing treatment). As another example, fracture flow parameters derived from previous fracturing operations may enable predictions of fracture flow properties based on a proposed pumping schedule or other aspects of a formation treatment plan for subsequent operations in the field.

Some of the techniques and operations described herein may be implemented by one or more computing assemblies configured to provide the functionality described. In various instances, a computing assembly may include any of various types of devices, including, but not limited to, handheld mobile devices, tablets, notebooks, laptops, desktop computers, workstations, mainframes, distributed computing networks, and virtual (cloud) computing systems.

Figure 2:
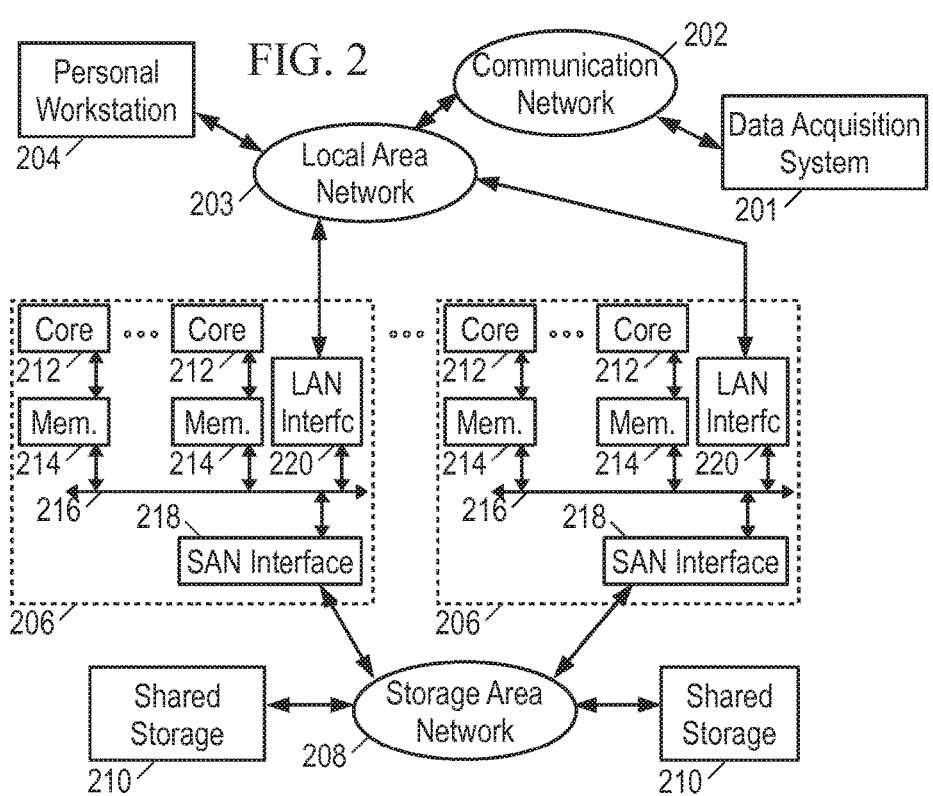
FIG. 2 is a block diagram of an illustrative hydraulic fracture modeling system.

FIG. 2 shows an illustrative computing system in which a data acquisition system 201 represents the instrument trucks 112 and other sources of data regarding the well and surrounding formations. A communications network 202 (such as, e.g., the internet or other communications link for transferring digital data) couples the data acquisition system 201 to a local area network (LAN) 203 to communicate the data to a personal workstation 204. The data can include treatment program data, geological data, fracture data, fluid data, or other types of information. Workstation 204 may take the form of a desktop computer having a user interface (e.g., keyboard, mouse, and display) that enables the user to interact with the other elements of the computing system, e.g., by entering commands and viewing responses. In this fashion, the user is able to retrieve the well data and make it available for simulation of flow in a network of fractures.

Workstation 204 may lack sufficient internal resources to perform such processing in a timely fashion for complex fracture networks. The LAN 203 further couples the workstation 204 to one or more multi-processor computers 206, which are in turn coupled via a storage area network (SAN) 208 to one or more shared storage units 210. LAN 203 provides high-speed communication between multi-processor computers 206 and with personal workstation 204. The LAN 203 may take the form of an Ethernet network.

Multi-processor computer(s) 206 provide parallel processing capability to enable suitably prompt processing of the measurements and fracture modeling information to simulate fracture fluid flows. Each computer 206 includes multiple processors 212, distributed memory 214, an internal bus 216, a SAN interface 218, and a LAN interface 220. Each processor 212 operates on allocated tasks to solve a portion of the overall problem and contribute to at least a portion of the overall results. Associated with each processor 212 is a distributed memory module 214 that stores application software and a working data set for the processor's use. Internal bus 216 provides inter-processor communication and communication to the SAN or LAN networks via the corresponding interfaces 218, 220. Communication between processors in different computers 206 can be provided by LAN 204 or via a mailbox mechanism on storage devices 210.

SAN 208 provides low-latency access to shared storage devices 210. The SAN 208 may take the form of, e.g., a Fibrechannel or Infiniband network. Shared storage units 210 may be large, stand-alone information storage units that employ magnetic disk media for nonvolatile data storage. Other suitable forms of nontransitory information storage media can also be employed. To improve data access speed and reliability, the shared storage units 210 may be configured as a redundant disk array ("RAID").

It is the software that configures the various parts of the computing system to coordinate and collectively operate as a modeling and simulation system. One or more commercially available software packages and libraries may be installed in the computer assembly to provide the functionality for solving linear systems. User-authored programs, functions, scripts, workflows, or other programming mechanisms may be employed to customize the operation of the software and automate certain operations such as those outlined below for formulating reservoir formation models and simulating fluid flows and fracture propagation. The applications software may include a formation modeling module, a fracture mapping module, an equation construction module, an equation solving module, a user interface module, and other function modules, each implemented in the form of machine-readable instructions. Examples of commercially available software that support the use of such programming include C, C++, C++ AMP, D, Erlang, Python, and Fortran. The computing system can be preprogrammed or can be programmed (and reprogrammed) by loading a program from another source (e.g., from a CD-ROM or other nontransient information storage medium, from another computer device through a data network, or in another manner). Nevertheless, the implementation of the following methods is not limited to any specific software language or execution environment.

The software operating on the computing system may be structured as indicated by the software architecture shown in FIG. 3. A data acquisition module 302 stores various types of data in a measurement database 304. The measurement database may include treatment program information such as a pumping schedule, flow rates, flow volumes, slurry concentrations, fluid compositions, injection locations, shut-in times, or other parameters. The measurement database may further include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, natural fracture geometries, or other attributes of one or more rock formations in the subterranean zone. The geological data can include information collected from well logs, rock samples, outcroppings, microseismic imaging, tilt measurements, or other data sources.

The measurement database may still further include fluid data relating to well fluids and entrained materials. The fluid data may identify types of fluids, fluid properties, thermodynamic conditions, and other information related to well assembly fluids. The fluid data can include flow models for compressible or incompressible fluid flow. For example, the fluid data can include coefficients for systems of governing equations (e.g., Navier-Stokes equations, advection-diffusion equations, continuity equations, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, hydraulic fluids that operate well assembly tools, or other fluids that may or may not be related to a well assembly.

Simulation software 306 (including the fracture mapping, spatial discretization, equation construction, and solving modules, collectively termed the processing module) employs the information from the measurement database 304 to locate and model the flow of fluids along hydraulically induced fractures. The fracture and fluid properties are stored in model database 308. The fracture and fluid properties may include time-dependent spatial distribution of fluid flow parameters as discussed further below. A visualization and analysis module 310 generates visual representations of the fractures and flow properties for an operator, generally in an interactive form that enables the operator to enhance portions of the model and derive analytical results therefrom. The visual representation may depict spatial distributions of values and/or integrated values such as injected volumes, flow rates, fracture dimensions, and estimated permeabilities. In some contemplated embodiments, the analysis module further produces recommendations for real-time modifications to treatment plans that are underway.

We turn now to a discussion of certain fracture network modeling details. The hydraulic fracturing operations produce complex fracture networks that pose steep requirements for computationally modeling physical phenomena (such as crack propagation and fluid-structure interactions) to the desired accuracy. One of the challenges associated with developing computational models is discretization of the spatial domain where the computer accounts for and distinguishes between the fluid and solid regions, which vary with respect to time.

One approach disclosed by Shetty and Lin in "A Fast Parallel Coupled Hydraulic Fracture Simulator", SPE-171902-MS, 2014, models the fracture network using a representation similar to that shown in FIG. 4A. A borehole 402 couples a surface inlet 404 to one or more perforations 406. The borehole is modeled as a series of cylindrical segments. Fluid treatments are supplied at the surface inlet 404 and reach the fracture network via the perforation(s) 406. Each perforation 406 couples the treatment fluid flow to a network of fractures 408 extending into a reservoir 409. Junctions 410 are formed where the fractures 408 intersect or terminate. Regions enclosed by the fractures 410 are rock blocks 412. Thus, the modeled physical domain is broken into five subdomains: borehole 402, fractures 408, reservoir 409, junctions 410, and rock blocks 412.

Though the fractures 408 represent three dimensional objects having a length, a height, and an aperture, the flow parameters are modeled as uniform across the height and aperture, enabling each fracture to be treated as one-dimensional as shown in FIG. 4B. (The borehole can be similarly modeled as one dimensional.) Between the two end points (junctions), the fracture is divided into discrete points at which the flow parameters (flow rate, pressure, proppant concentration, density, and viscosity) are calculated. The differential equations that govern the simulated fluid flow exhibit improved numerical stability when the points at which the flow rate is calculated are offset from the remaining parameters. Accordingly, the points labeled $M_i$ are the ith point at which the mass flow rate is determined, and the points labeled $P_i$ are the ith point at which the pressure and the other fluid parameters are determined. (All parameter types are determined at the junctions.) Each pair of points $M_i$, $P_i$, represent the control volume having a length of H. The distance from the junction to the adjacent discrete point is H/2.

As discussed by Shetty and Lin, the fractures and junctions are coupled to the rock blocks, causing the rock blocks to deform and displace in based in part on the forces exerted by the fluid flow. The simulation software models each rock block as having corner points 502 that coincide with the junctions and one or more intermediate "key" points 504 spaced along each fracture. The displacements of these points affect the net cross-sectional area of the fractures.

The set of corner points 502 associated with a given junction define the junction area (indicated in FIG. 5A with cross-hatching). Where the junction is defined in part by a fracture extending along a boundary of the fracture network (and hence lacks a rock block on one side), the set of corner points is incomplete.

In FIG. 5B a fracture extending along a boundary 510 meets a fracture extending along a second boundary 511 to form a junction having only one corner point 502A. An additional corner point 512 may be located by taking a projection of the corner point 502A onto the boundary 510. Such a projection may be done by locating the point on the boundary closest to the corner point 502A, e.g., by representing the boundary 510 with a unit vector; defining a vector from an arbitrary point on the boundary to the corner point 502A, and taking a dot product to determine the correct distance from the arbitrary point. Other projection techniques may alternatively be employed, e.g., extending the line segment representing a face of the rock block to determine where it intersects the boundary. A similar projection of the corner point 502A onto the second boundary 511 provides another additional corner point 513. Together with the original corner point 502A, the additional corner points 512-513 form a complete set of corner points with which a junction area can be defined.

FIG. 5B further shows a junction formed in part by a fracture between two rock blocks (which provide two corner points 502B and 502C). The intersecting fractures both extend along the boundary 510. To complete the set of corner points, original corner points 502B, 502C may each be projected onto boundary 510, thereby defining an additional corner points 514, 515.

The fractures that define a given junction are ordered, e.g., by proceeding counterclockwise around the junction from a chosen reference fracture. The corner points associated with the fractures are similarly ordered, thereby providing an order to the set of corner points associated with a junction. A closed polygon can be defined with a line drawn from each corner point to the next, and a line from the last corner point to the first, as indicated in FIG. 6. Taking the coordinates of the ith point to be $(x_i, y_i)$, the enclosed polygon area is:

$$A_P = \frac{1}{2}[(x_1 - x_2)(y_1 + y_2) + \ldots + (x_i - x_{i+1})(y_i + y_{i+1}) + \ldots + (x_N - x_1)(y_N + y_1)]$$

Note that if the set of corner points is ordered in a clockwise fashion, this formula yields the negative of the enclosed area $A_P$. The polygon area can alternatively be expressed (and calculated) in other ways.

In some embodiments, the area of the junction is calculated as the polygon area 506 (FIG. 5C):

$$A_J = A_P$$

In some alternative embodiments, the area of the junction is calculated as the sum of the polygon area 506 and the fracture throat areas 522. When the simulation software uses the staggered discrete points for determining fracture flow (FIG. 4B), there remains a control volume of length H/2 at each end of the fracture where the mass conservation equations are not enforced. If this volume is accounted for in the junction area calculation, mass conservation is then enforced by the governing equations for the junction. This alternative calculation further enables a well-defined area to be determined for junctions between two end-to-end fractures, where the set of corner points has only two corner points (yielding a polygon area of zero). Otherwise, such junctions would need to be pruned and the two fractures treated as a single fracture. The alternative junction area calculation is:

$$A_J = A_P + P\frac{H}{2}$$

where P is the perimeter of the polygon. These areas may be combined with the fracture heights (or a junction height) to obtain a junction volume.

The governing equations for the borehole, fractures, rock blocks, reservoir, and junctions are set forth in Shetty and Lin, "A Fast Parallel Coupled Hydraulic Fracture Simulator", SPE-171902-MS, 2014, with the continuity equations for the junction being modified to account for transient effects:

$$\frac{\partial \rho_J A_J}{\partial t} + \sum \dot{m} = 0$$

$$\frac{\partial \rho_p \phi A_J}{\partial t} + \sum \frac{\dot{m}\phi \rho_p}{\rho_J} = 0$$

where $\rho_J$ is the fluid mixture density, $\dot{m}$ represents the mass flow rates from each of the fractures associated with the junction, $\rho_p$ is the proppant density, and $\phi$ is the volume fraction of the proppant for that junction. The simulation software may further employ the junction area to model settling and screening of proppants within the junction.

Figure 7:
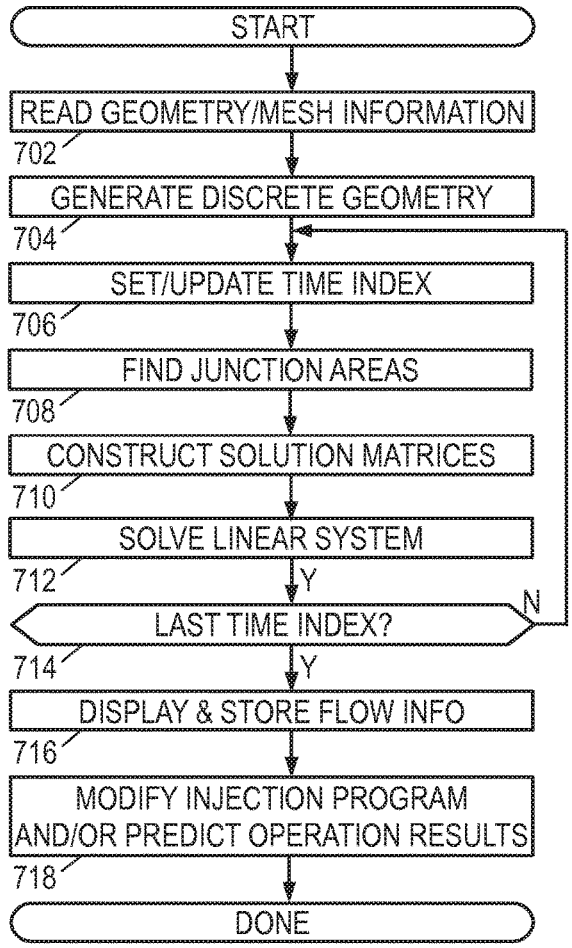
FIG. 7 is a flow diagrams of an illustrative fracture flow simulation method.
Figure 8:
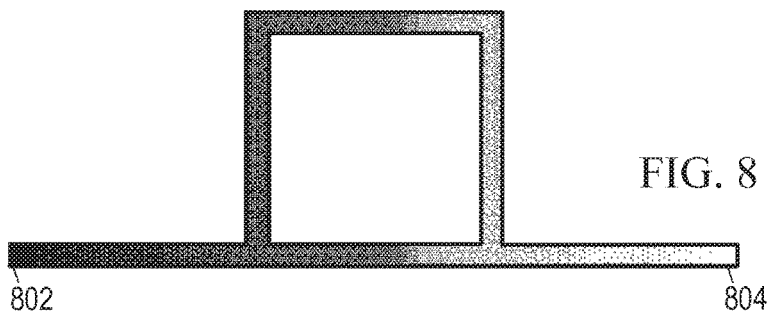
FIG. 8 is an illustrative spatial distribution of a flow parameter.

In view of the foregoing principles and techniques, FIG. 7 presents an illustrative hydraulic fracture flow simulation method that may be implemented in large part by the previously described computing systems. Though the operations of the method are shown and described as being sequential, in practice some of the operations are expected to occur concurrently and with potentially different orders.

The method begins in block 702 with the simulator reading the information regarding the spatial properties of the region to be simulated, including formation layering, well positioning, fracture modeling, treatment planning, and any acquired measurements suitable for setting boundary conditions. In block 704, the simulator discretizes the volume and fracture geometry to generate a graph representation of the borehole and fracture network, with edges representing fractures, vertices representing junctions, and faces representing rock blocks within a reservoir. Discrete points along the faults and around the rock blocks are identified for calculation of flow parameters, deformations and displacements of rock blocks, and solid-fluid interactions. The simulator then initializes a time index for the flow simulation in block 706, and updates it each time the loop (blocks 706-714) is repeated.

In block 708, the simulator calculates a junction area for each junction. The simulator uses the junction areas in block 710 when it constructs a set of sparse matrices representing the relationships between the system elements and expressing the subsequent state of the system in terms of the current state. Depending on the model structure, the sparse matrices may embody a connection graph in which the graph nodes may represent the discrete points along the fracture paths, rock blocks, and model boundaries, while the graph edges represent the interactions (multi-phase mass flows and forces) between the graph nodes. As blocks deform and fractures propagate, the connection graph may change, along with the various parameters representing the time-dependent state of the system, necessitating that the matrices be updated. For guidance on deriving the model and linear equations from the discretized volume and fracture network graph representation, see Bai and Lin, "Tightly coupled fluid-structure interaction computation algorithm for hydraulic fracturing simulations", $48^{th}$ US Rock Mechanics Symposium Minneapolis, 2014 (ARMA 14-7258). Other model structures may alternatively be employed.

In block 712 the simulator solves the linear system of equations represented by the sparse matrices. The information obtained from the solution enables the simulation to determine the time-dependent spatial distribution of fluid components and flow parameters. This new distribution will be employed for simulating the next time step. In block 714, the simulator determines whether the last time step has been reached, and if not, blocks 706-714 are repeated to move the simulation forward. After completion, the time-dependent spatial distributions of fluids and flow parameters are stored in block 716 and displayed by the visualization module. In block 718, the results are used as a basis for predicting the results of an ongoing or future fracturing program and/or modifying the fracturing program, e.g., by adjusting the injection fluid compositions, flow rates, volumes, etc. as needed to achieve the desired fracturing results.

FIG. 7 shows an illustrative spatial distribution of pressure that was determined in accordance with the foregoing process. The fluid flow emanates from a source 702 and flows to a sink 704, producing a gradual pressure drop along both paths. The associated flow rates and proppant deposition along each fracture and at each junction can be similarly determined.

In summary, the embodiments disclosed herein include:

A: A hydraulic fracturing flow simulation method that comprises: identifying a network of fractures having junctions where two or more fractures intersect; ordering a set of corner points associated with each junction; calculating a junction area from each set of corner points; determining a current state that includes flow parameter values at discrete points arranged along the fractures in said network; constructing a set of linear equations for deriving a subsequent state from the current state while accounting for said junction areas; repeatedly solving the set of linear equations to obtain a sequence of subsequent states, the sequence embodying a time-dependent spatial distribution of at least one flow parameter; and displaying the time-dependent spatial distribution.

B: A hydraulic fracturing flow simulation system that comprises: a data acquisition module collecting measurements from a subterranean formation; a processing module implementing a hydraulic fracturing simulation method; and a visualization module that displays the time-dependent spatial distribution. The simulation method includes: deriving from the measurements a network of fractures having junctions where two or more fractures intersect; ordering a set of corner points associated with each junction; calculating a junction area from each set of corner points; determining a current state that includes flow parameter values at discrete points arranged along the fractures in said network; constructing a set of linear equations for deriving a subsequent state from the current state while accounting for said junction areas; and repeatedly solving the set of linear equations to obtain a sequence of subsequent states, the sequence embodying a time-dependent spatial distribution of at least one flow parameter.

Each of the embodiments A and B, may further include one or more of the following additional features in any combination: (1) the set of linear equations include one or more continuity equations for each junction, the one or more continuity equations depending in part on the junction area. (2) the dependence of the continuity equations includes a time derivative of the junction area. (3) the method includes, for junctions of one or more fractures extending along a boundary, projecting each original corner point in the set of corner points onto each said boundary to obtain additional corner points for the set of corner points. (4) said calculating a junction area includes determining an enclosed area of a polygon defined by the ordered set of corner points. (5) said calculating a junction includes adding a fracture throat area to the enclosed area of the polygon. (6) the fracture throat area is a product of a perimeter of the polygon with half a control volume length. (7) a non-transitory computer-readable medium that stores the time-dependent spatial distribution. (8) the method includes modifying a fracturing program based on the time-dependent spatial distribution. (9) the flow parameter types comprise pressure and flow rate.

Numerous variations and modifications will become apparent to those skilled in the art once the above disclosure is fully appreciated. The ensuing claims are intended to cover such variations where applicable.

What is claimed is:

1. A hydraulic fracturing flow simulation method that comprises:
   during a fracturing operation, identifying a network of fractures having junctions where two or more fractures intersect;
   ordering a set of corner points associated with each junction;
   calculating a junction area from each set of corner points;
   determining a current state that includes flow parameter values at discrete points arranged along the fractures in said network;
   constructing a set of linear equations for deriving a subsequent state from the current state while accounting for said junction areas;

repeatedly solving the set of linear equations to obtain a sequence of subsequent states, the sequence embodying a time-dependent spatial distribution of at least one flow parameter;

displaying the time-dependent spatial distribution; and controlling the fracturing operation to modify at least one fracture treatment plan parameter selected from the group of a pumping rate, a pressure, a volume of fluid, a fluid composition, and timing, based on the time-dependent spatial distribution of the at least one flow parameter.

2. The method of claim 1, wherein the set of linear equations include one or more continuity equations for each junction, the one or more continuity equations depending in part on the junction area.

3. The method of claim 2, wherein the dependence of the continuity equations includes a time derivative of the junction area.

4. The method of claim 1, further comprising, for junctions of one or more fractures extending along a boundary, projecting each original corner point in the set of corner points onto each said boundary to obtain additional corner points for the set of corner points.

5. The method of claim 1, wherein said calculating a junction area includes determining an enclosed area of a polygon defined by the ordered set of corner points.

6. The method of claim 5, wherein said calculating a junction further includes adding a fracture throat area to the enclosed area of the polygon.

7. The method of claim 6, wherein the fracture throat area is a product of a perimeter of the polygon with half a control volume length.

8. The method of claim 1, further comprising storing the time-dependent spatial distribution on a non-transitory computer-readable medium.

9. The method of claim 1, further comprising modifying a fracturing program based on the time-dependent spatial distribution.

10. The method of claim 1, wherein the flow parameter values comprise pressure and flow rate.

11. A hydraulic fracturing flow simulation and control system that comprises:

a data acquisition system that collects measurements from a subterranean formation during a fracturing operation;

at least one multi-processor computer and non-transitory computer readable medium containing instructions;

wherein the instructions are for causing the at least one multi-processor computer to implement a hydraulic fracturing simulation method that includes:

deriving from the measurements a network of fractures having junctions where two or more fractures intersect;

ordering a set of corner points associated with each junction;

calculating a junction area from each set of corner points;

determining a current state that includes flow parameter values at discrete points arranged along the fractures in said network;

constructing a set of linear equations for deriving a subsequent state from the current state while accounting for said junction areas; and repeatedly solving the set of linear equations to obtain a sequence of subsequent states, the sequence embodying a time-dependent spatial distribution of at least one flow parameter;

a display that displays the time-dependent spatial distribution; and a treatment control system that modifies at least one fracture treatment plan parameter selected from the group of a pumping rate, a pressure, a volume of fluid, a fluid composition, and timing, based on the time-dependent spatial distribution of the at least one flow parameter to control the fracturing operation.

12. The system of claim 11, wherein the set of linear equations include one or more continuity equations for each junction, the one or more continuity equations depending in part on the junction area.

13. The system of claim 12, wherein the dependence of the continuity equations includes a time derivative of the junction area.

14. The system of claim 11, wherein the method further comprises, for junctions of one or more fractures extending along a boundary, projecting each original corner point in the set of corner points onto each said boundary to obtain additional corner points for the set of corner points.

15. The system of claim 11, wherein said calculating a junction area includes determining an enclosed area of a polygon defined by the ordered set of corner points.

16. The system of claim 15, wherein said calculating a junction further includes adding a fracture throat area to the enclosed area of the polygon.

17. The system of claim 16, wherein the fracture throat area is a product of a perimeter of the polygon with half a control volume length.

18. The system of claim 11, further comprising a non-transitory computer-readable medium that stores the time-dependent spatial distribution.

19. The system of claim 11, wherein the method further comprises modifying a fracturing program based on the time-dependent spatial distribution.

20. The system of claim 11, wherein the flow parameter values comprise pressure and flow rate.

* * * * *